United States Patent [19]

Hartung

[11] Patent Number: 4,951,606
[45] Date of Patent: Aug. 28, 1990

[54] FISH TANK FOR INTENSIVE FISH FATTENING AND PROCESS FOR OPERATING SUCH A FISH TANK

[75] Inventor: Christoph Hartung, Kelkhiem, Fed. Rep. of Germany

[73] Assignee: Metz Mannheim GmbH, Mannheim, Fed. Rep. of Germany

[21] Appl. No.: 162,338
[22] PCT Filed: Jun. 10, 1987
[86] PCT No.: PCT/EP87/00302
§ 371 Date: Feb. 11, 1988
§ 102(e) Date: Feb. 11, 1988
[87] PCT Pub. No.: WO87/07475
PCT Pub. Date: Dec. 17, 1987

[30] Foreign Application Priority Data

Jun. 12, 1986 [DE] Fed. Rep. of Germany ....... 3619757

[51] Int. Cl.⁵ .............................................. A01K 63/00
[52] U.S. Cl. .................................................... 119/3
[58] Field of Search ..................... 119/2, 3, 4; 210/169

[56] References Cited

U.S. PATENT DOCUMENTS

| | | | |
|---|---|---|---|
| 3,166,043 | 11/1965 | Castillo | 119/3 |
| 3,716,025 | 2/1973 | Lawson | 119/3 |
| 3,778,976 | 12/1973 | Pond | 210/169 X |
| 3,842,804 | 10/1974 | Christensen et al. | 119/3 |
| 3,900,004 | 8/1975 | Goldman et al. | 119/3 |
| 3,996,893 | 12/1976 | Buss | 119/3 |
| 4,043,299 | 8/1977 | Birkbeck et al. | 119/3 |
| 4,067,809 | 1/1978 | Kato | 210/169 |
| 4,211,183 | 7/1980 | Hoult | 119/3 |
| 4,212,268 | 7/1980 | Chapman | 119/3 X |
| 4,213,421 | 7/1980 | Droese et al. | 119/3 |
| 4,370,947 | 2/1983 | Hilken | 119/3 |
| 4,752,388 | 6/1988 | Ng | 210/169 |

Primary Examiner—Robert P. Swiatek
Assistant Examiner—Nicholas D. Lucchesi
Attorney, Agent, or Firm—Herbert L. Lerner; Laurence A. Greenberg

[57] ABSTRACT

Intensive fish fattening in open waters is increasingly disturbed by deposits of harmful substances. Fish fattening in artificial ponds is uneconomic because of the considerable outlay in terms of the fresh water and area required. These disadvantages can be overcome by a specially designed fish tank and a new process for operating such fish tanks. The fish tank (10) has, in its longitudinal center axis, a pit (11), into which a filler (31) with vertically extending flow channels (37) is placed. The fish water, together with an air/oxygen mixture, is circulated through these flow channels approximately 30 times per hour. The fish water is purified (nitrified) biologically according to the adhesive activated-sludge process by micro-organisms adhering to the filler. 50 to 500 liters of fresh wtare per kg of growing fish are added to the fish water, depending on the type of fish.

13 Claims, 4 Drawing Sheets

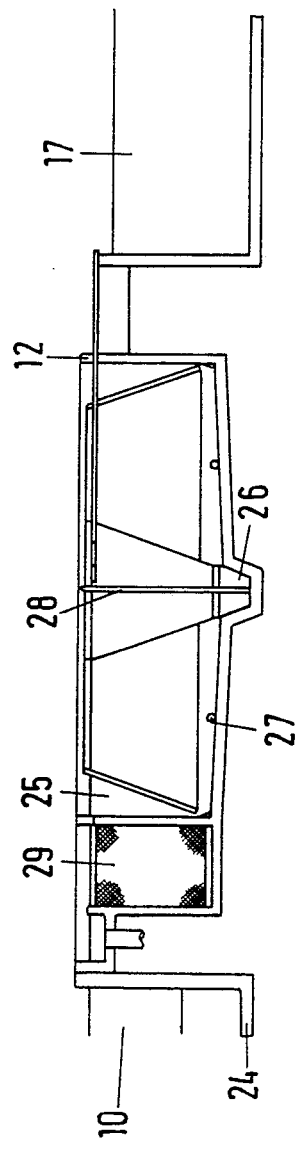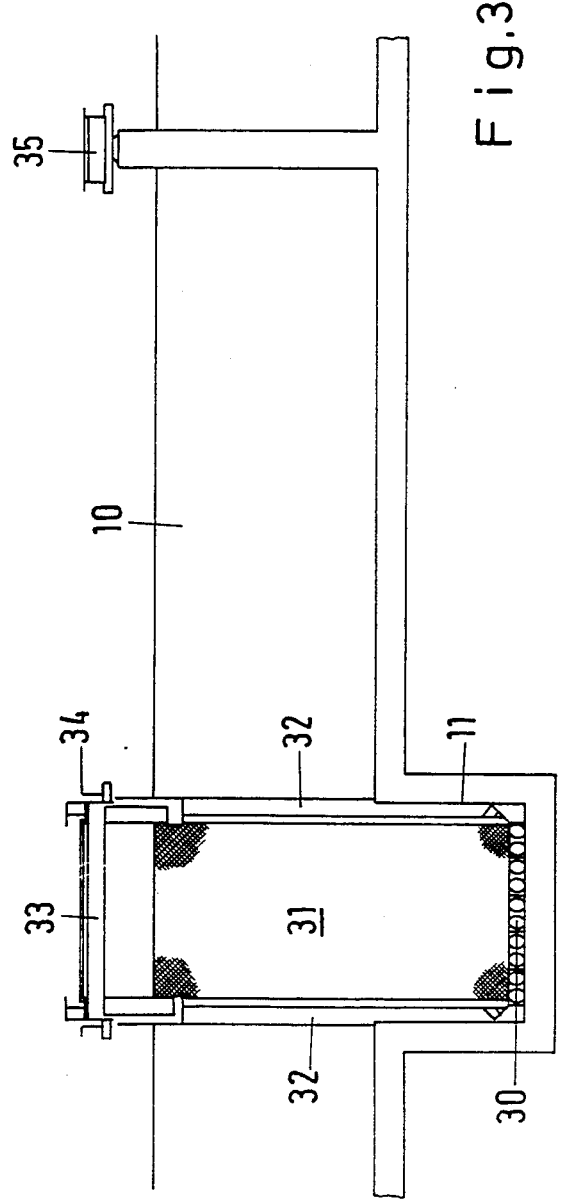

FISH TANK FOR INTENSIVE FISH FATTENING AND PROCESS FOR OPERATING SUCH A FISH TANK

The invention relates to a fish tank for intensive fish fattening, which has a device for feeding air and/or oxygen to the fish water and which is preferably designed as a long tank, to a system consisting of several fish tanks and to a process for operating such a fish tank or such a system.

Intensive fish fattening in open waters has been known for a long time. Since the biological equilibrium of such open waters is disturbed to an ever-increasing extent by deposits of harmful substances and the breeding conditions therefore continually deteriorate, there has been a change to fish fattening in artificial ponds. However, these known systems have to be operated at a considerable outlay, especially in terms of the fresh water and area required, thus casting doubts on the economic viability of the fattening processes. Other considerable disadvantages of these known processes are to be seen in the constant alternation of the water temperature during daytime and nighttime operation and in the different seasons, the high risks presented by fish diseases and the dangers caused by environmental poisons introduced into the ponds.

The object on which the present invention is based is, therefore, to develop a fish tank for intensive fish fattening and a process for operating such a fish tank, which can be operated without the considerable risks of known processes and with high economic efficiency irrespective of the seasons and fluctuations in the weather.

According to the invention, in a fish tank of the type described in the introduction, this object is achieved by providing the long tank along its longitudinal center axis, with a depression in the form of a pit, in which is arranged a filler which reaches at least up to the water surface and through which the fish water flows, the filler having flow channels which extend preferably vertically from the lower region of the pit virtually up to the water surface and into which can be introduced in their lower end portion an air/water mixture which can be conveyed out into the fish water in their upper end portion. The special design of the fish tank with the pit in the longitudinal center axis of the tank and with the filler in this pit makes it possible to keep the fish water clean and enrich it with oxygen in an especially simple and economical way, so that two essential fundamental conditions for keeping the fish stock healthy are satisfied.

In a system consisting of several fish tanks according to the invention, there is provided a preceding holding tank for the fattened fish intended for sale, and following settling tanks, the fish tanks having nets or grids which are guided along the longitudinal extension of the latter and by means of which the fish in the fish tank can be sorted, so that the ready-fattened fish can be transferred into the holding tank.

The nets or grids have differing mesh widths or distances between the bars, so that the fish can be extracted while sorted according to size by means of the nets.

The nets are tensioned in frames which can be guided horizontally or vertically in rails set in the fish-tank wall and/or the fish-tank floor.

The settling tanks are preferably circular tanks which in their centers have a recess, from which the settled fish impurities and feed residues can be sucked off. Partitioned off in the peripheral region of the settling tanks is an annular chamber, into which the dirty fish water can be introduced preferably tangentially, and the clarified fish water can be sucked off from the remaining inner space of each settling tank which is relatively flow-free.

In a process for operating a fish tank or a system, the water in the fish tanks is maintained at a uniform temperature suitable for the type of fish, a continuous air stream is supplied through the inlet orifices to the flow channels in the fillers, so that the fish-water is dragged along according to the air lift effect by the air rising in the vertical flow channels and the water in the fish tanks is ventilated and circulated approximately 30 times per hour via the filler, the water in the fish tanks is purified (nitrification) biologically according to the adhesive activated-sludge process by micro-organisms adhering to the filler, and the pH value of the water in the fish tanks is kept virtually constant by the addition of milk of lime to the water of the settling tanks.

Cooler fresh water from a deep well or from the holding tank is added to the water in the fish tanks, preferably in a quantity of 50 to 500 liters per kg of growing fish, depending on the type of fish, or 1 to 10 $m^3$ per hour for a tank content of 500 $m^3$.

Water in the fish tanks is treated, so that the treated fraction corresponds to an addition of fresh water of 50 to 500 liters per kg of growing fish, depending on the type of fish, or 1 to 10 $m^3$ per hour for a tank content of 500 $m^3$.

The water in the fish tanks and the holding tank is kept constantly aerobic.

In order to scrape off the growth forming on the hoses in the filler during the operation of the fish tanks, the air supply to the prestressed hoses is stopped and the hoses in the filler are relaxed.

Water is sucked off from the floor of the fish tanks into the settling tanks and is pumped back into the fish tanks in the purified state. The system according to the invention is characterized by the nets which are intended for extracting the fish from the fish tanks, and by a particularly advantageously designed shape of the settling tanks for the fish impurities and feed residues.

The process according to the invention is characterized particularly by the effective circulation of the fish water, its nitrification and the simple way in which the hoses supplying the atmospheric oxygen are kept clean during the operation of the fish tanks.

The invention is described and explained in detail below with reference to an exemplary embodiment illustrated in the drawing.

BRIEF DESCRIPTION OF THE DRAWINGS

FIG. 2 shows a vertical section through a settling tank of the system according to FIG. 1;

FIG. 3 shows a vertical section through part of a fish tank of the system according to FIG. 1, with a filler inserted;

Figure 1:
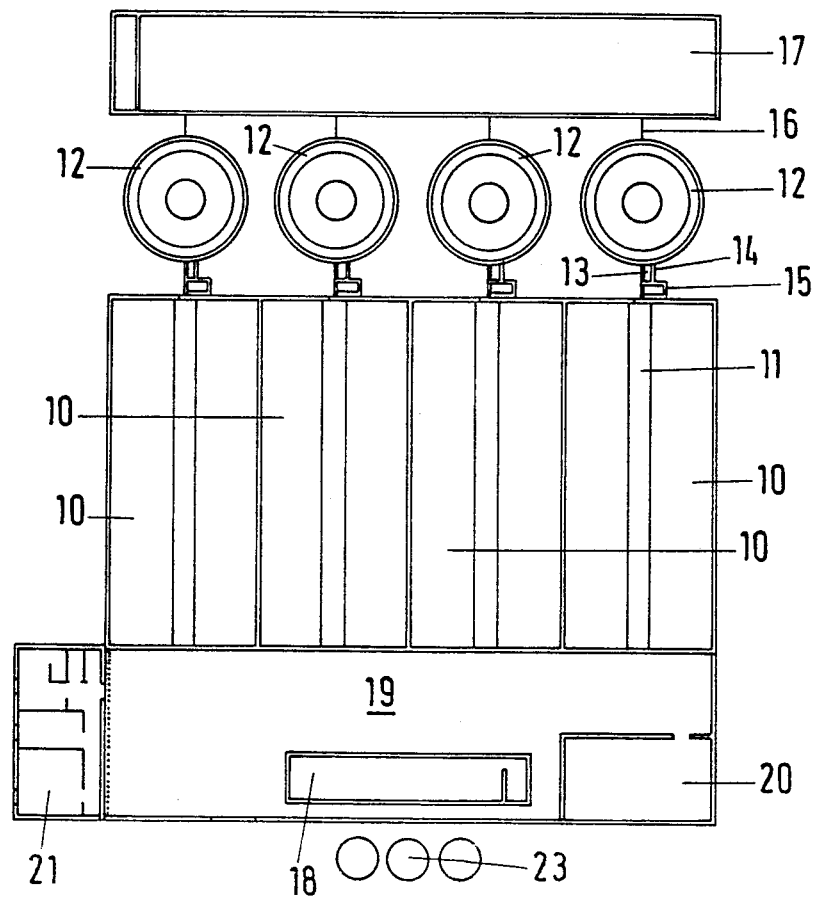
FIG. 1 shows a plan view of a system consisting of several fish tanks connected in parallel.

The system according to FIG. 1 consists of four fish tanks 10 which are arranged next to one another, are designed as long tanks and in their center axis have a depression in the form of a pit 11. Each of these fish tanks 10 is followed by a settling tank 12, and these are designed as circular tanks and are connected to the respective fish tanks 10 assigned to them by means of outflow and return lines 13 and 14 and a pump 15. The settling tanks 12 are also connected, via lines 16, to a collecting tank 17 for the dirty water or sludge sucked off from the settling tanks 12.

The settling tanks 12 are located in front of one of the two end walls of the long tanks 10: on the other end face there is a control room 19 for the staff operating the system. A holding tank 18 for receiving the fattened fish extracted from the fish tanks 10 is set up in this control room 19. A store-room 20 is divided off from the control room 19, and administrative rooms 21 for the staff operating the system are built onto the control room. Three feed bins 23 for the fish feed are arranged outside these rooms.

FIG. 2 shows a vertical section through a settling tank 12 with its feed and discharge lines. The fish water sucked off from the bottom of the fish tank 10 and soiled by the fish secretions and the feed residues flows through a pipe 24 from the left in the drawing and is fed to a V-shaped chamber 25 on the inner peripheral surface of the circular settling tank 12, in such a way that it flows in the annular chamber 25 in the clockwise direction. In this relatively slow flow, the sludge settles to the bottom and is forced through a gap in the floor space of the settling tank 12, from which it moves towards the recessed center 26 of the settling tank. Along this path, the sludge passes an oxygen-supplying pipeline 27 on the floor of the settling tank 12. The atmospheric oxygen issuing from the pipeline 27 clarifies the sludge in a first step according to the activated-sludge process, that is to say nitrifies it. The sludge is sucked off from the recess 26 via a pipe 28 and delivered to the collecting tank 17.

The clean water is sucked off from the surface of the settling tank 12 and on the one hand pumped back into the fish tank 10 by a pump 29 working according to the air lift effect and on the other hand pumped in a small fraction into the chamber 25, so that a flow assisting the escape of the sludge from the chamber 25 is maintained between the chamber and the remaining inner space of the settling tank 12.

FIG. 3 shows a cross-section through part of a fish tank 10 with the pit 11 in the longitudinal center axis of the fish tank. Polyurethane hoses 30 are laid on the bottom of the pit 11 under prestress, so that they are stretched slightly in their longitudinal direction. The hoses 30, on their top side, have small orifices, through which an air/oxygen mixture flowing through the hoses 30 can escape in a finely distributed manner. A filler 31 inserted into the pit 11 and reaching up to the water surface of the fish tank 10 is arranged above the hoses 30. The filler 31 is composed of a pack of honeycomb-shaped plastic articles which can be connected to one another and which form flow channels extending vertically. The finely distributed air/oxygen bubbles issuing from the hoses 30 enter the lower orifices of these flow channels and according to the air lift effect drag the fish water with them in the vertical flow channels of the filler 31, and this fish water, enriched with oxygen, comes out at the upper end of the flow channels and flows to the right and left back into the two halves of the fish tank 10. In this way, the entire fish water in the fish tank 10 is circulated thirty times per hour and at the same time enriched with oxygen, that is to say the total content of the fish tank 10 is circulated through the filler 31 within two minutes. In the known artificial ponds for fish fattening, it is customary to circulate the fish water six times a day. During circulation, the fish water is purified, that is to say nitrified, biologically according to the adhesive activated-sludge process by the microorganisms adhering to the filler 31, so that maximum purity of the fish water is guaranteed at all times at a low technical outlay and a low outlay in energy terms. By nitrification is meant the oxidation of ammonia via nitrite into nitrate by means of bacteria living in the water.

The relatively high flow speed in the filler 31 prevents a growth forming on the inner faces of the filler. The growth which is formed during the operation of the fish tanks 10 on the outer surface of the hoses 30 is scraped off from time to time. For this purpose, the prestress exerted on the hoses 30 is removed, that is to say the hoses are relaxed and the supply of the air/oxygen mixture stopped.

The side walls 32 holding the filler 31 in the pit 11 end approximately at the height of the uppermost two to three plastic honeycombs of the filler, so that the ventilated fish water issuing from the top side of the filler can easily flow back into the fish tank 10 on both sides.

A mechanical attachment 33 on the upper end piece of the filler 31 serves, among other things, for fastening a rail 34, in which, as in a rail 35 fastened to the opposite longitudinal wall of the fish tank 10, is guided a net which is tensioned vertically downwards and the lower net edge of which is guided in rails in the fish tank floor which are not shown in the drawing. Instead of the net, a metal grid consisting of preferably vertical bars extending parallel to and at a distance from one another can also be used. It is thus possible to guide the net or grid through the fish tank 10 parallel to the end wall of the fish tank and thereby concentrate the fish in a small space in the fish tank, so that, if appropriate, they can be extracted easily. It is expedient to use nets of differing mesh widths or grids of differing distances between the bars, so that the fish can be sorted according to size by means of the nets or grids. This is necessary especially when the salable fattened fish are to be separated. The salable fish sorted out in this way are then received into the holding tank 18, the water of which is somewhat colder than the fish water in the fish tank 10. The sorting out of the salable fish can be made even easier by vertically movable nets at one end of the elongate fish tanks 10.

Because of the rapid and frequent circulation of the fish water in the fish tanks 10, the system requires only a very small amount of fresh water. Depending on the type of fish, 50 to 500 liters of fresh water per kg of growing fish are added to the tank water, that is to say in a tank containing 500 m$^3$ of fresh water that represents approximately 1 to 10 m$^3$ per hour, this requirement appropriately being met from a deep well located near the system, so that the added fresh water is free of heavy metals and iron oxides. Instead of the addition of fresh water, treatment of the tank water, for example by means of reverse osmosis, can also be carried out, so that the fraction of treated water corresponds to the above mentioned fresh-water requirement. It is important that the fish water should never circulate under anaerobic conditions at any point. To keep the pH value of the water constant, milk of lime is appropriately added to the tank water in the settling tanks 12. Depending on the type of fish, the temperature of the tank water is 16° to 28° C. The fish water is heated solely by the heat released by the metabolism of the fish, so that no additional heat energy need be expended.

Figure 4:
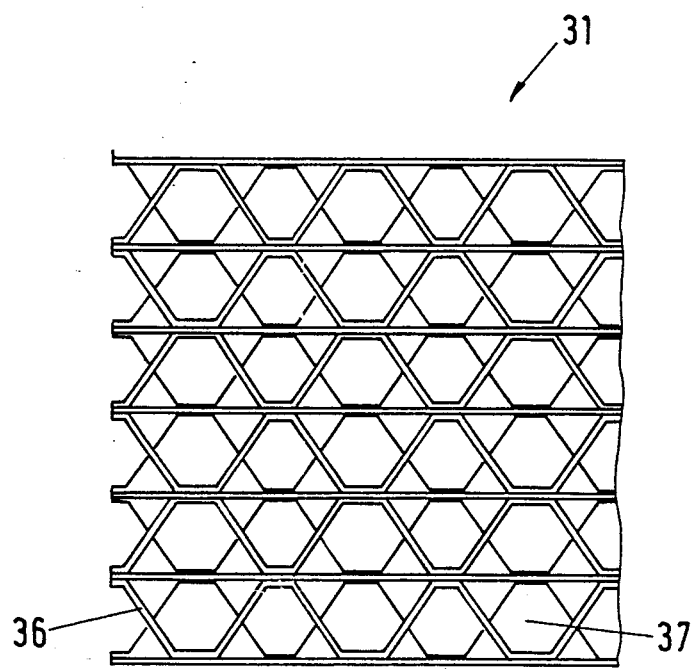
FIG. 4 shows a horizontal cross-section through the filler according to FIG. 3.

The sectional representation in FIG. 4 shows the construction of the filler 31. The filler 31 consists of a pack of honeycomb-shaped plastic articles 36 which are glued or welded to one another and which are arranged on top of one another in such a way that the individual honeycombs form vertical flow channels 37 for the fish water which is dragged upwards by the fine bubbles of air/oxygen mixture flowing out from the hoses 30 and which flows out at the upper end of the flow channels.

Figure 5:
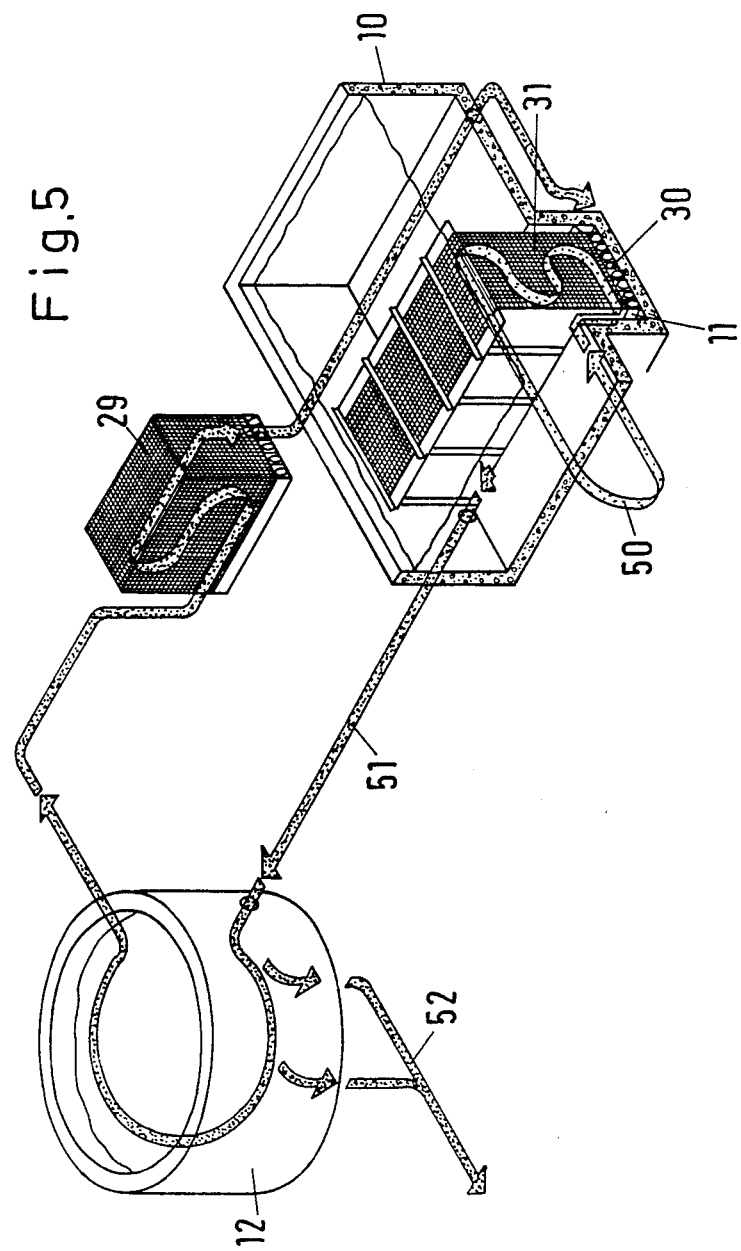
FIG. 5 shows a flow diagram of the system according to FIG. 1.

The entire water circulation in the system is shown diagrammatically in the flow diagram according to FIG. 5. The filler 31 can be seen above the hoses 30 in the pit 11 of the fish tank 10. As a result of the air lift effect already described, by means of the filler 31 the fish water is circulated approximately 30 times per hour along the flow path designated by 50 and at the same time is enriched with atmospheric oxygen. In a second fish-water circulation system, the fish water enriched with precipitated fish impurities and feed residues is sucked off the floor of the fish tank 10 and fed to the annular peripheral space 25 of the settling tank 12. There, the dirt settles in a way described in the introduction and is fed to the tank 17 via the line 16 (see FIGS. 1 and 2). In FIG. 5, this is indicated by the flow arrow 52. The clarified fish water is sucked off from the settling tank 12 by means of the pump 29, likewise working according to the air lift effect, and is fed to the fish tank 10 on the side located opposite the sucking-off side of the dirty fish water. This guarantees that the purified fish water flows through the entire length of the fish tank 10, before it is sucked off again together with the impurities.

Both the decomposition of the fish impurities and feed residues and the purification of the fish water are therefore carried out according to a biological process. It is thereby possible to operate the system by recycling, and as already mentioned this results in a very low fresh-water requirement But this in turn makes it possible to do without any external heating of the fish water.

The feeding of the fish is carried out by means of automatic mechanisms not shown in the drawing, so that overfeeding is prevented and the incidence of unconsumed feed residues in the fish water is kept to a minimum.

Because of the modular construction of the system as a whole, it is easily possible, at any time, to adapt the capacity of the system to the particular fish requirement by attaching further tanks or shutting down existing tanks.

I claim:

1. In a system having an elongated fish tank with a longitudinal center axis, the fish tank containing water and at least one filler with upwardly oriented flow channels having upper and lower ends, a method for intensive fish fattening which comprises:
   introducing at least one gas from the group consisting of air and oxygen into lower ends of the flow channels in the at least one filler disposed in a depression in the form of a pit formed along the longitudinal center axis in the fish tank, transporting water through the flow channels to the upper ends of the flow channels by aeration, and biologically purifying and nitrifying the water by microorganisms clinging to the at least one filler, in a first water treatment cycle;
   sucking off water from the bottom of the fish tank through a suction line, supplying the sucked off water to a device for removing fish impurities and feed residues, and feeding clarified water from the device back into the fish tank through a return line, in a second water treatment cycle.

2. Method according to claim 1, which comprises circulating the water in the fish tank approximately thirty times per hour in the first water treatment cycle.

3. Method according to claim 1, which comprises maintaining the water in the fish tank at a uniform temperature suitable for a given type of fish.

4. Method according to claim 1, which comprises maintaining the pH value of the water in the fish tank virtually constant.

5. Method according to claim 1, which comprises adding fresh water to the water in the fish tank.

6. Method according to claim 1, which comprises maintaining the water in the fish tank constantly aerobic.

7. System for intensive fish fattening, comprising a fish tank with a bottom for receiving water, said fish tank being elongated and having a longitudinal center axis along which a depression in the form of a pit is formed, at least one filler disposed in said depression, said at least one filler having vertically oriented flow channels formed therein with upper and lower ends, means for introducing at least one gas from the group consisting of air and oxygen into said lower ends of said flow channels for transporting water through said flow channels to said upper ends of said flow channels by aeration while biologically purifying and nitrifying the water by microorganisms clinging to the at least one filler, a suction line communicating with said fish tank in the vicinity of said bottom, a device connected to said suction line downstream of said fish tank as seen in flow direction for removing fish impurities and feed residues, a return line connected between said device for removing fish impurities and feed residues and said fish tank, and a pump connected to one of said lines.

8. System according to claim 7, wherein said at least one filler is formed of a packing of interconnected honeycomb-shaped plastic bodies defining said vertical flow channels.

9. System according to claim 7, wherein said gas introducing means include a blower and hoses connected to said blower and disposed at the bottom of said at least one filler, said hoses having orifices formed therein below said lower ends of said flow channels through which gas conveyed through said hoses by said blower rises upward through said flow channels together with water carried by the gas.

10. System according to claim 9, wherein said hoses are formed of polyurethane.

11. System according to claim 7, including a holding tank connected to said fish tank for fattened fish intended for sale.

12. System according to claim 7, including nets disposed in said fish tank for separating fish in said fish tank.

13. System according to claim 7, including grids disposed in said fish tank for separating fish in said fish tank.

* * * * *